Figure 1:
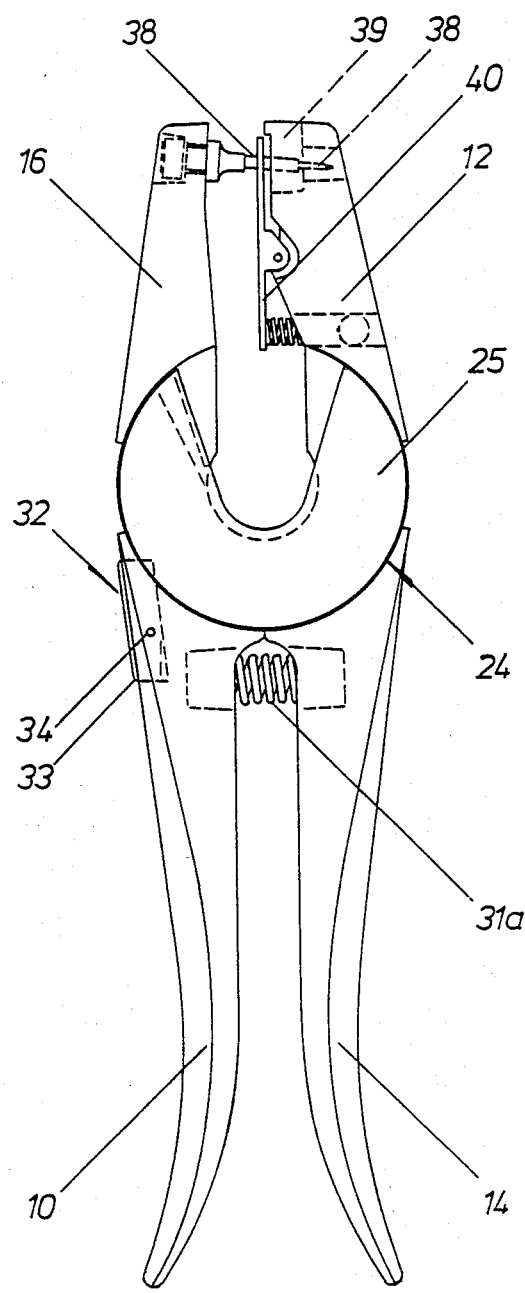

United States Patent [19]

Reggers et al.

[11] Patent Number: 4,531,520
[45] Date of Patent: Jul. 30, 1985

[54] APPLICATOR TOOL

[76] Inventors: Charles G. Reggers, 1 Maxwell Line; Lindsay W. J. Cohr, Aranui Rd., R.D. 5; Stafford A. Y. Liddell, 129 Ruahine St., all of Palmerston North, New Zealand

[21] Appl. No.: 455,970

[22] Filed: Jan. 6, 1983

[30] Foreign Application Priority Data

Jan. 14, 1982 [NZ] New Zealand .......................... 199494
Nov. 4, 1982 [NZ] New Zealand .......................... 202390

[51] Int. Cl.³ .............................................. A61B 17/00
[52] U.S. Cl. ...................................... 128/330; 72/409; 81/416
[58] Field of Search .......................... 128/330, 321–324; 72/409–410; 81/415–416, 405–408, 394; 40/300–302; 119/135

[56] References Cited

U.S. PATENT DOCUMENTS

| 255,105 | 3/1882 | Ewan | 72/410 |
| 1,018,839 | 2/1912 | Mann | 81/416 |
| 1,843,819 | 2/1932 | Jackson | 81/416 |
| 2,274,945 | 3/1942 | Van Keuren | 81/416 |
| 3,559,515 | 2/1971 | Kyser | 81/416 |
| 3,636,954 | 1/1972 | Weston | 81/416 |
| 3,812,859 | 5/1974 | Murphy et al. | 128/330 |
| 3,847,037 | 11/1974 | Fox | 72/409 |
| 3,982,450 | 9/1976 | Marsh | 81/416 |
| 4,164,224 | 8/1979 | Hastings | 128/330 |

FOREIGN PATENT DOCUMENTS 1016650  9/1957  Fed. Rep. of Germany ........ 81/416

Primary Examiner—C. Fred Rosenbaum
Assistant Examiner—Gene B. Kartchner
Attorney, Agent, or Firm—Blakely, Sokoloff, Taylor & Zafman

[57] ABSTRACT

An animal ear tag applicator tool comprising a first lever and a second lever forming handles and coupled to each other by pivot means to be pivotable about a pivot axis. First and second jaws are actuatable by the levers and each jaw is provided with retention means for retaining a part of an animal ear tag. The tool is characterized by the pivot means being an open central pivot with the center of the pivot being in open communication with the space between the jaws at the open and closed positions of the jaws as well as during movement of the jaws between the open and closed positions.

16 Claims, 11 Drawing Figures

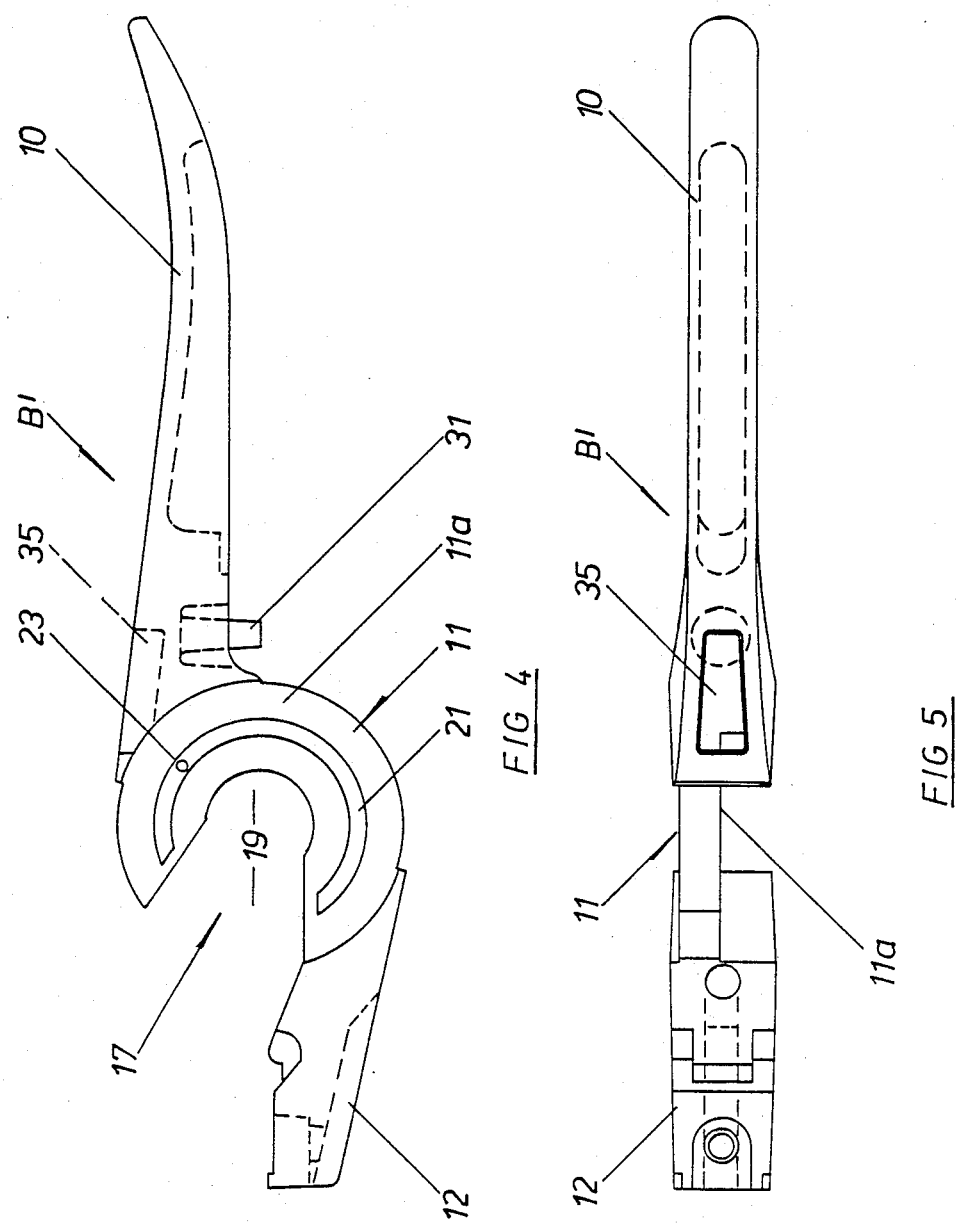

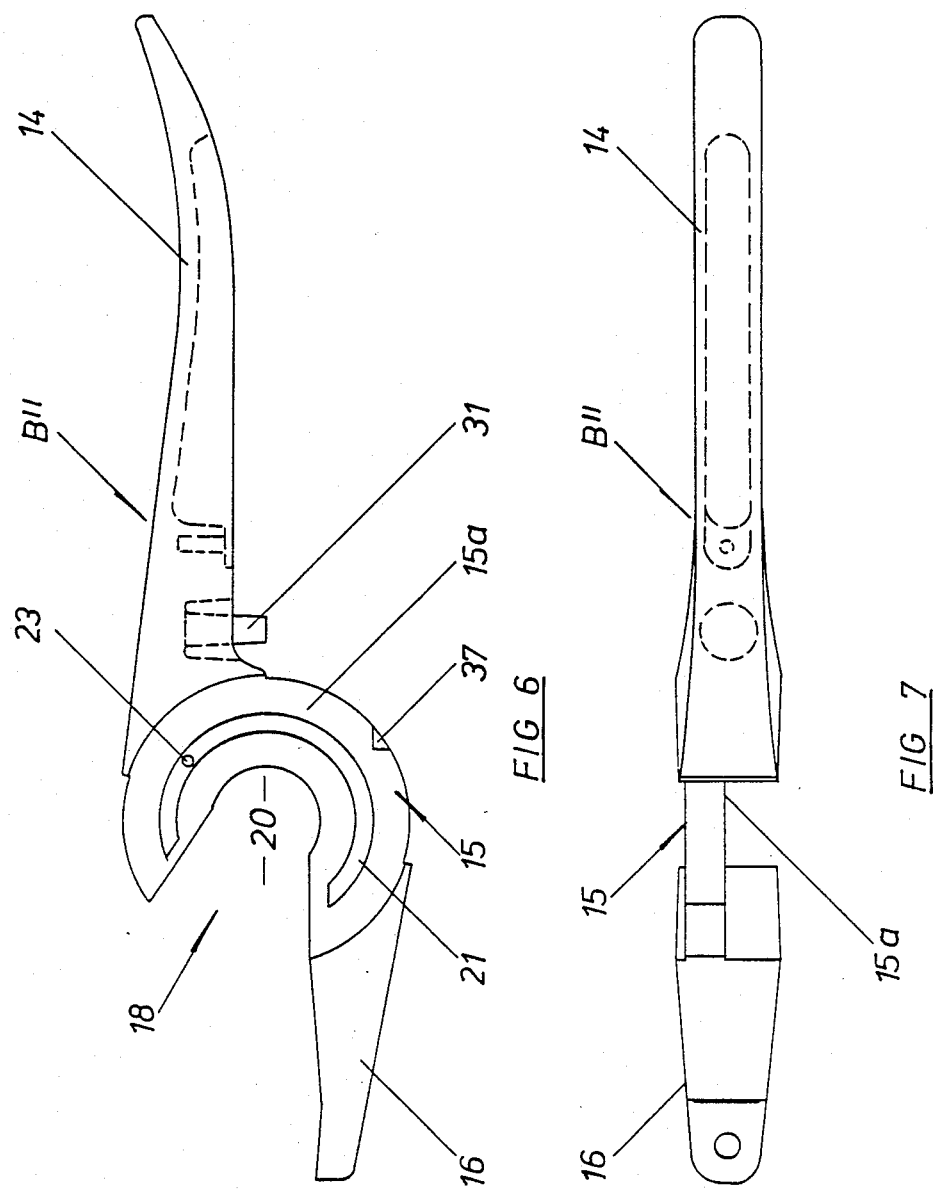

APPLICATOR TOOL

This invention relates to an applicator tool for applying a tag, such as an identification ear tag, to an animal.

Animal ear tag applicator tools are known which have a construction comprising first and second levers coupled to each other by pivot means to be pivotable about a pivot axis. First and second jaws are actuated by the levers and each jaw is provided with retention means for retaining a part of an animal ear tag. A return means such as a spring is provided for returning the jaws from a closed position to an open position. Such ear tag applicator tools are, for example, described and claimed in our U.S. Pat. Nos. 3,812,859 and 4,120,303.

During use of the applicator tool a component of an ear tag (which can, for example, be an ear tag of the type disclosed in our U.S. Pat. No. 3,731,414) is mounted on each jaw so that they are disposed opposite one another. An animal's ear is then located within the space between the jaws so that the bottom of the ear is located adjacent the throat of the applicator. By moving the jaws to the closed position the male and female parts of the ear tag are brought together and thus the tag is applied to the animal's ear.

In the closed position the portion of each jaw which is adjacent the pivot connection between the levers (i.e. in the throat of the applicator) are at their closest approach and therefore the ear of the animal can become trapped between the jaws with the possibility of injury thereto. To overcome this problem the throat of the applicator can be made deeper by lengthening the jaws so that the retention means are further away from the pivot. This, however, is not a practical solution to the problem as the lever ratio decreases and application of the tag becomes more difficult.

The present invention overcomes this difficulty by providing an applicator tool which is characterized by having an open centred pivot means with the centre of the pivot being in open communication with the space between the jaws at said open and closed positions as well as during movement of said jaws between the open and closed positions.

By using the open centred pivot in communication with the space between the jaws the throat of the applicator is effectively spaced further away from the retention means. The effective lever ratio is, however, not altered because the axis of pivotal movement is not changed. Accordingly the ear of the animal can be accommodated within the throat of the applicator without becoming trapped between the jaws at the so-called closed position.

Figure 2:
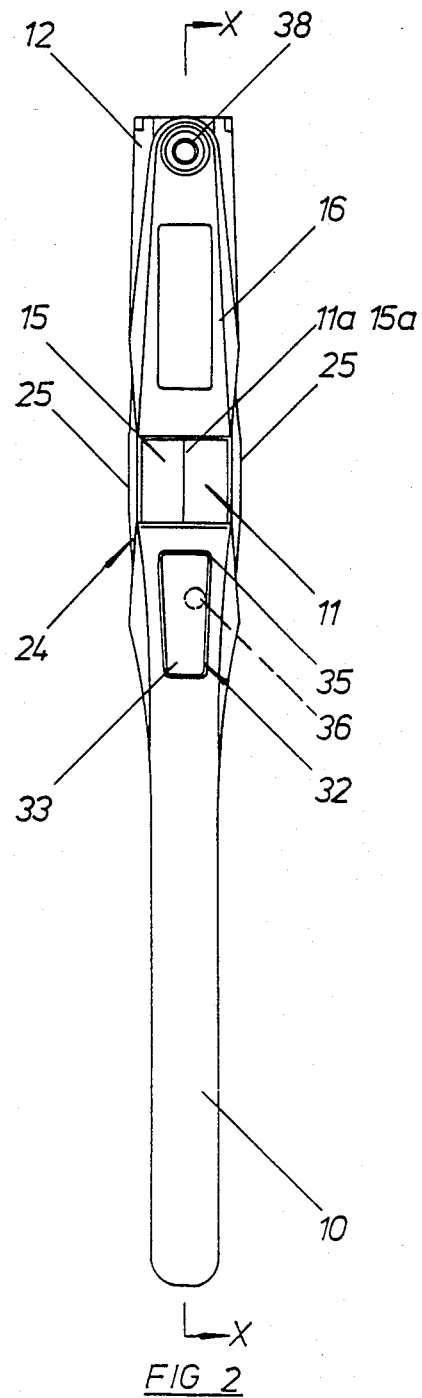
Figure 3:
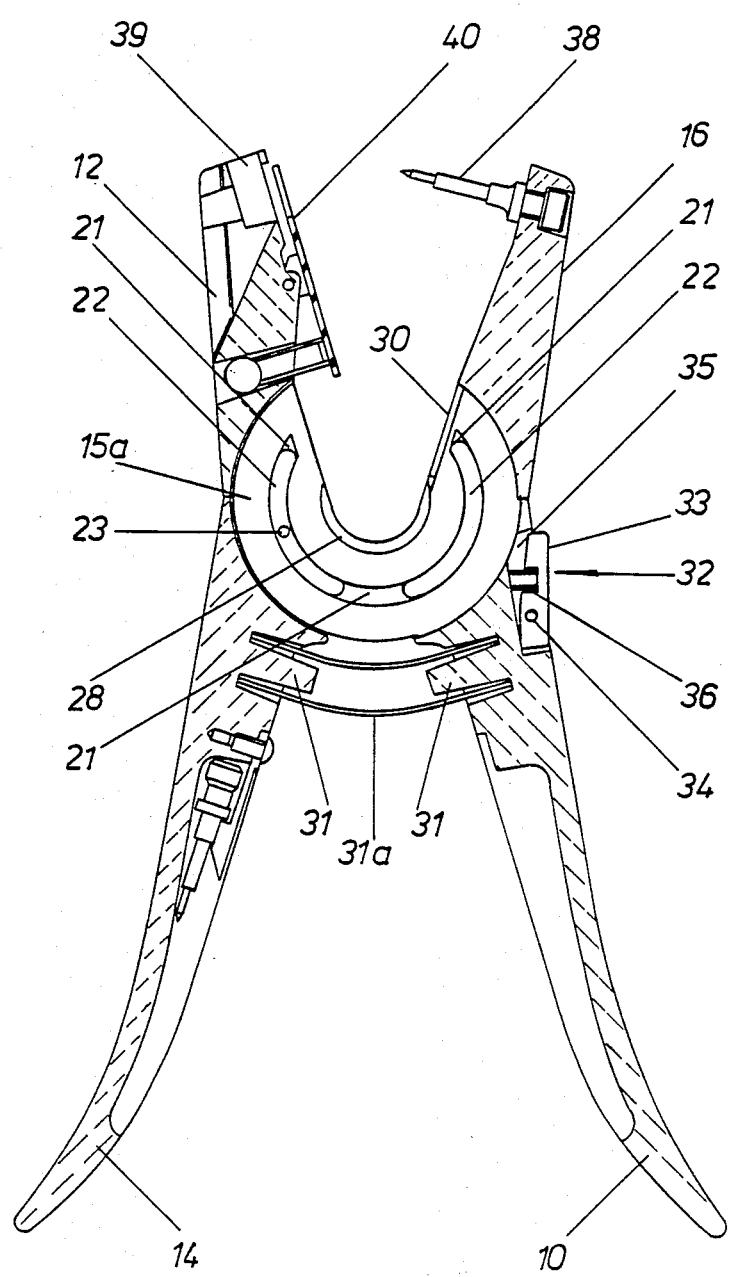
Figure 8:
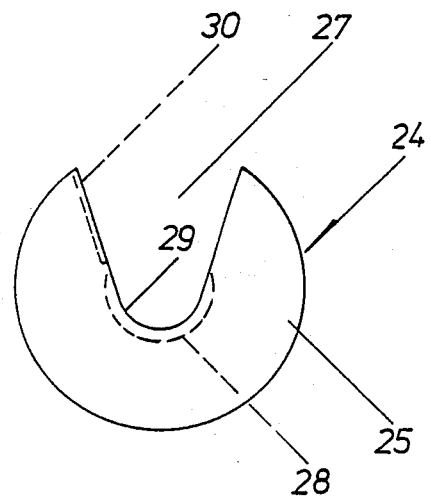
Figure 9:
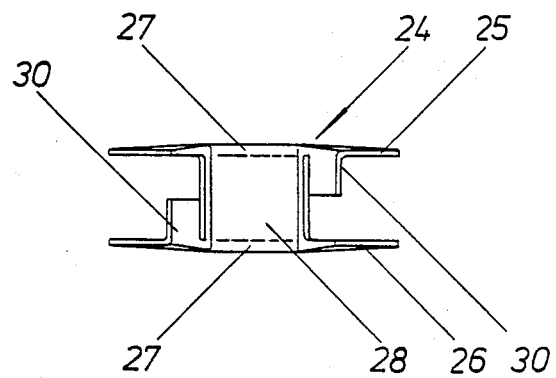
Figure 10:
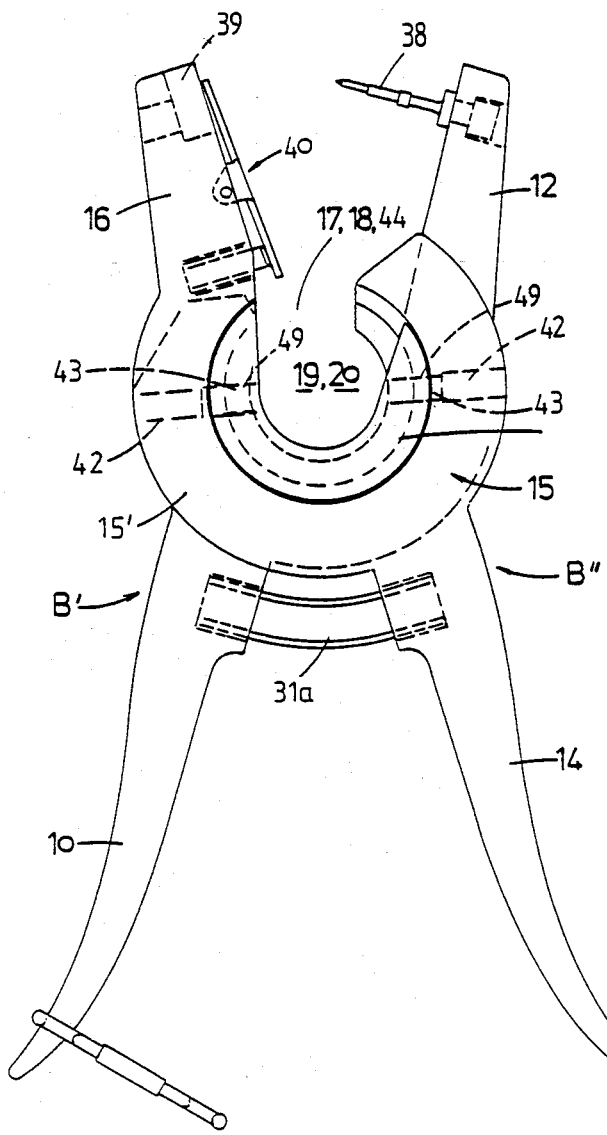
Figure 11:
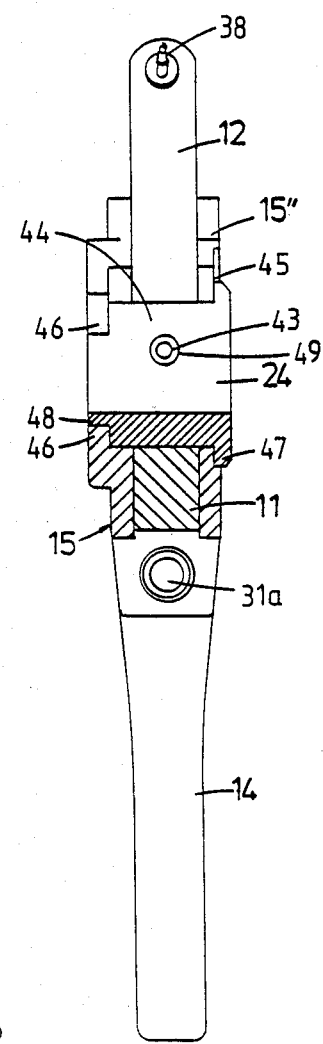

To more fully describe the invention reference will be made to the accompanying drawings in which:

FIG. 1 is an elevational view of the applicator tool according to the invention, FIG. 2 is a side elevational view of the tool shown in FIG. 1, FIG. 3 is a cross-sectional view on X—X of FIG. 2, FIG. 4 is an elevational view of one lever and jaw half of the tool, FIG. 5 is a side elevational view of the lever and jaw half of FIG. 4, FIG. 6 is a similar view to that of FIG. 4 but showing the other lever and jaw half of the tool, FIG. 7 is a side elevational view of the lever and jaw half of FIG. 6, FIG. 8 is a plan view of the clamp bush which joins the lever and jaw halves together, FIG. 9 is an end view taken in the direction of arrow A of FIG. 8, FIG. 10 is an elevational view of a second form of the applicator tool according to the invention, and FIG. 11 is a cross-section taken on line Z—Z of FIG. 10.

According to the preferred forms of the invention the applicator tool essentially consists of two halves B' and B'' (which can for example be of cast alloy construction) each of which comprises an integral handle, body portion and jaw portion. These two halves B' and B'' are coupled together by being interfitted and held together by suitable means.

Different methods of interfitting the applicator halves B' and B'' can be employed and the following description relate to one preferred form. FIG. 4 of the drawings shows one half B' of the applicator tool and this half consists of a lever 10, which is in the form of a handle, a body portion 11 and a jaw portion 12. The second half B'' of the applicator tool is shown in FIG. 6 and consists of a lever 14, also in the form of a handle, a body portion 15 and a jaw portion 16. Each of body portions 11 and 15 are of annular form with a substantially radially disposed opening 17 and 18 respectively extending into the inner circular open part 19 and 20 respectively.

Referring to FIGS. 5 and 7 it is observed that body portions 11 and 15 are of less cross-sectional thickness than the respective lever and jaw portions. Each of body portions 11 and 15 are situated to one side of the longitudinal axis of symmetry of the applicator half. To assemble the applicator the two halves B' and B'' are brought together so that flat surfaces 11a and 15a of body portions 11 and 15 respectively are in face to face contact (see FIG. 2). To maintain the halves B' and B'' together a bush clamp 24, which is more particularly illustrated in FIGS. 8 and 9, is utilised.

The bush clamp 24 can be constructed from any suitable material such as a resilient plastics material (e.g. acetal). The clamp consists of a pair of opposite parallel disposed flanges 25 and 26 each of which is preferably formed with a slightly dished configuration as can be seen in FIG. 9. Each flange 25 and 26 is formed with a radially disposed open ended slot 27. Flanges 25 and 26 are joined together by a part annular wall 28 which is of an arcuate cross-sectional shape similar to that of the arcuate inner end of slot 27 thereby wall 28 is situated about the curved inner portions 29 of slots 27. A pair of diagonally opposed outer straight edges of slots 27 are provided with inwardly projecting walls 30 which in the assembled applicator form cover plates.

When the applicator halves B' and B'' are interfitted the bush clamp is passed through the aligned openings 17 and 18 thereof and force fitted through the entry into the aligned inner circular open parts 19 and 20 of body portions 11 and 15 respectively. Wall 28 of the bush clamp 24 is thus situated within the aligned open parts 19 and 20 with flanges 25 and 26 situated in face to face contact with the outermost surfaces of body portions 11 and 15. The bush clamp 24 therefore forms not only the pivot but also the means whereby the applicator halves are retained in their interfitted relationship.

Each body portion 11 and 15 is formed with a concentric groove 21 in bearing surfaces 11a and 15a respectively. A bearing insert 22 which is approximately half the length of groove 21 is inserted and pinned by pin 23 at one end of the groove 21. Accordingly when surfaces 11a and 15a are in face to face contact the bearing insert 22 located in one groove 21 engages in the portion of the groove 21 of the opposite surface which is not taken up by the bearing insert in that groove. The bearing insert is preferably formed of a plastics material and the interengagement of these bearing inserts 22 between grooves 21 form a bearing surface to prevent binding between surfaces 11a and 15a.

Each of levers 10 and 14 are formed with a spigot 31 which locates a free end of spring 31a. This spring 31a is thus positively located between the upper ends of levers 10 and 14 to normally urge the levers apart as shown in FIG. 3. Spigots 31 also provide a positive stop at closing of the applicator by engaging end to end.

To lock the applicator in the closed position shown in FIG. 1 a locking toggle 32 is provided. Locking toggle 32 consists of a toggle 33 pivotally mounted on a pin 34 within the confines of recess 35. Toggle 33 is biased to the unlocked position shown in FIG. 3 by spring 36. When the applicator is placed in the closed position (FIG. 1) toggle 33 is pushed into the position shown whereby the leading inner edge of the toggle is located in rebate 37 of body portion 15 and wedges therein due to the levers attempting to move apart under the influence of spring 31a. To open the applicator pressure is applied to levers 10 and 14 to overcome the force exerted by spring 31a thus allowing spring 36 to force the toggle 32 to the unlocked position.

The applicator is completed by retention means on each jaw for retaining an ear tag part. In the preferred arrangement the retention means on jaw 16 is a pin 38 whilst the retention means on jaw 12 is an open ended slot 39 which combines with a spring loaded clip 40. With such retention means the applicator is suitable for the application of ear tags according to our U.S. Pat. No. 3,731,414 and for a more detailed description of the clip 40, open ended slot 39 and pin 38, reference can be made to the disclosure in our U.S. Pat. No. 3,812,859.

A different method of interfitting the applicator halves B' and B'' is shown in FIGS. 9 and 10. As with the previously disclosed embodiment one half B' consists of a lever 10, which is in the form of a handle, a body portion 11 and a jaw portion 12 whilst the second half B'' consists of a lever 14, also in the form of a handle, a body portion 15 and a jaw portion 16. Each of body portions 11 and 15 are of annular form with an opening 17 and 18 respectively extending radially into the inner circular open part 19 and 20 respectively.

Body portion 15' which extends between handle 14 and jaw 16 is provided with an elongate slot. The portion 15'' of body 15 which extends upwardly from handle 14 is bifurcated in that it has an open ended slot therein which corresponds with the elongate slot in body portion 15'.

To assemble the applicator the two halves B' and B'' are combined by inserting jaw 12 through the slot in body portion 15' such that body portion 11 is confined wholely within body portion 15.

To maintain the two halves B' and B'' of the applicator together bush 24 is inserted into coaxial annular portions 19 and 20 and for locating purposes an annular ledge 45 and 46 is provided at either side of the body portion 15. Fitting within ledge 45 is a rim 47 of bush 24 whilst a reduced end portion 48 of bush 24 fits within the peripheral confines of the ledge 46. Bush 24 is provided with an opening 44 which aligns with aligned openings 17 and 18.

To retain the component parts in the assembled position a threaded fastening 43 extends through bores 42 in body portion 11 and into threaded bores 40 within bush 24. This fastening arrangement not only ensures that the component parts are mechanically combined but also ensures that bush 24 maintains a relationship with openings 17 and 18 such that the throat of the applicator, as formed by the aligned open parts 19 and 20 of body portions 11 and 15, is not closed off during movement of jaw 12 toward jaw 16, i.e. toward the closed position of the applicator.

The applicator according to the present invention has a throat which can accommodate the lower portion of an animal's ear when an ear tag is being applied thereto. The throat by being formed at least in part by the open centred pivot is not restricted in size during application even when the jaws 12 and 16 are at their closest approach therefore there is little likelihood of the animal's ear becoming clamped between the two jaws of the applicator tool. The desired lever ratio of 2:1 is maintained as the formation of the deep jaw does not effect the effective distance between the retention means and the pivot axis.

In yet a further form of the invention the applicator tool can be of a type where the jaw portions are not formed integrally with the body portions, but can be pivoted thereto such as in the manner disclosed in our U.S. Pat. No. 4,120,303. In such a form the jaw portion can move rectilinearly toward one another and be automatically retracting.

We claim:

1. An animal ear tag applicator tool comprising a pair of levers coupled together by pivot means which extends through said levers such that said levers are pivotable about a pivot axis, the levers being formed to one side of the pivot axis as handles and to the other side of the pivot axis as jaws, said jaws when the applicator tool is in an open position being in a spaced apart opposed disposition defining therebetween a space, relative movement of said handles toward one another about said pivot axis causing relative movement of said jaws toward one another to a closed position wherein the jaws spaced apart but the space therebetween is reduced, and retaining means with each jaw for, in use of the applicator tool, retaining an animal ear tag part, characterized in that the pivot means includes an open recess extending through the jaws and within which recess the pivot axis is located, said recess being aligned with the space between the jaws in the open and closed positions thereof, as well as during relative movement of the jaws between said open and closed positions.

2. An applicator tool as claimed in claim 1 wherein said pivot means is formed by a bush which extends through said levers, said bush having a longitudinal opening in the wall thereof to provide communication between the internal part of said bush and said space between the jaws.

3. An applicator tool as claimed in claim 2 wherein the bush is located within aligned recesses formed in said levers, each said lever including a body portion, said body portion having at least one of said recesses formed therein.

4. An applicator tool as claimed in claim 3 wherein the body portion of each lever has a substantially flat bearing surface located at right angles to said pivot axis, said flat bearing surfaces being in sliding surface to surface contact, and said bush is flanged at each end thereof, the flanges being in sliding contact with the surfaces of the respective body portions which are located substantially parallel to the interface between the flat bearing surfaces.

5. An applicator tool as claimed in claim 4 wherein the flanged bush is formed of a resilient plastics material.

6. An applicator tool as claimed in claim 3 wherein the body portion of one lever is sandwiched between a pair of parallel spaced apart flat bearing surfaces formed by the body portion of the other lever.

7. An applicator tool as claimed in claim 1 wherein each said lever includes a body portion located between said handle and said jaw, said body portions being coupled together such that relative pivotal movement about said pivot axis can occur but axial movement is prevented, said body portions each including a recess extending therethrough said recesses being aligned to form the aforesaid open recess.

8. An applicator tool as claimed in claim 7 wherein each said body portion includes a bearing surface, said bearing surfaces being held in mutual sliding contact by first locating means which prevents said axial movement and second locating means which restrains said sliding contact to a pivotal movement about said pivot axis.

9. An applicator tool as claimed in claim 8 wherein said first locating means is a pair of spaced apart flanges each of which has a radially disposed open ended slot formed therein, said slots being aligned with each other, said flanges being joined together by a wall aligned with and extending between the innermost portions of said slots, said wall being located within said open recess and said flanges being disposed either side of and in contact with said body portions.

10. An applicator tool as claimed in claim 9 wherein the second locating means comprises curved bearing surfaces on each said body portion, said curved bearing surfaces of a said body portion being in sliding contact with curved guides formed on the respective opposite lever.

11. An applicator tool as claimed in claim 10 wherein a said curved guide is formed with and as part of each jaw and handle.

12. An applicator tool as claimed in claim 10 wherein said second locating means further includes a curved groove in one of said bearing surfaces and at least one correspondingly curved projection with said other bearing surface slidingly in said curved groove.

13. An applicator tool as claimed in claim 12 wherein a curved groove is formed in each said bearing surface and each projection is a curved insert located within both grooves.

14. An applicator tool as claimed in claim 9 wherein the flanges and wall are integrally formed from a resilient plastics material, said wall being curved in cross-section with a diameter of curvature substantially that of said inner peripheral surface.

15. An applicator tool as claimed in claim 9 wherein each body portion is of substantially annular shape and said recess in said body portion is formed by an open ended slot extending between an inner peripheral surface and an outer peripheral surface of the annular shaped body portion, and wherein the handle and jaw project in opposite directions from diametrically opposing sides of the body portion, said open end slot opening to the outer peripheral edge adjacent said jaw.

16. An applicator tool as claimed in claim 15 where the open ended slot tapers inwardly such that the smallest cross-sectional width of the slot is less than the diameter of the inner peripheral surface of the annular body portion.

* * * * *